(12) United States Patent
Best

(10) Patent No.: US 9,354,045 B1
(45) Date of Patent: May 31, 2016

(54) IMAGE BASED ANGLE SENSOR

(75) Inventor: Gregory C. Best, San Francisco, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 1122 days.

(21) Appl. No.: 13/251,210

(22) Filed: Oct. 1, 2011

(51) Int. Cl.
*H04N 7/18* (2006.01)
*G01B 11/25* (2006.01)
*G01B 11/02* (2006.01)

(52) U.S. Cl.
CPC ............. *G01B 11/25* (2013.01); *G01B 11/02* (2013.01); *G01B 11/026* (2013.01)

(58) Field of Classification Search
CPC .......... G01B 7/16; G01B 7/30; G01B 11/002; G01B 11/005; G01B 11/03; G01B 11/167; G01B 11/25; G01B 11/254; G01B 11/2527; G01B 11/2531; G01B 11/02
USPC .......................................... 348/131, 135, 116
See application file for complete search history.

(56) References Cited

U.S. PATENT DOCUMENTS

| | | | | |
|---|---|---|---|---|
| 3,772,686 | A * | 11/1973 | Chardon | 340/815.86 |
| 5,642,285 | A | 6/1997 | Woo | |
| 5,703,373 | A * | 12/1997 | Peckerar et al. | 250/491.1 |
| 5,835,209 | A * | 11/1998 | Umeda et al. | 356/141.3 |
| 6,088,469 | A * | 7/2000 | Fukumura et al. | 382/103 |
| 6,147,598 | A | 11/2000 | Murphy | |
| 6,282,362 | B1 | 8/2001 | Murphy | |
| 6,600,168 | B1 * | 7/2003 | Geng | G06K 9/2036 250/559.19 |
| 6,639,685 | B1 * | 10/2003 | Gu et al. | 356/603 |
| 6,764,373 | B1 * | 7/2004 | Osawa et al. | 446/175 |
| 6,788,210 | B1 * | 9/2004 | Huang et al. | 340/612 |
| 7,248,285 | B2 | 7/2007 | Needham | |
| 7,298,415 | B2 * | 11/2007 | Nilson et al. | 348/370 |
| 7,339,611 | B2 | 3/2008 | Marold | |
| 7,619,561 | B2 | 11/2009 | Scherzinger | |
| 7,650,013 | B2 | 1/2010 | Dietsch et al. | |
| 7,697,127 | B2 * | 4/2010 | Vogel et al. | 356/154 |
| 7,719,467 | B2 | 5/2010 | Norda | |

(Continued)

FOREIGN PATENT DOCUMENTS

| | | |
|---|---|---|
| EP | 1931945 A2 | 6/2008 |
| EP | 1936323 A2 | 6/2008 |

(Continued)

OTHER PUBLICATIONS

"Face Recognition Using Wavelet Transfonn, Fast Fourier Transform and Discrete Cosine Transform" 2003 IEEE Samra et al.*

(Continued)

*Primary Examiner* — Sath V Perungavoor
*Assistant Examiner* — Nathnael Aynalem
(74) *Attorney, Agent, or Firm* — Kilpatrick Townsend & Stockton LLP

(57) ABSTRACT

A method of image-based positioning is provided. The method comprises: (A) providing an image-capturing device integrated with an object; (B) providing a pattern-generating device configured to generate a set of patterns; (C) locating the pattern-generating device in a field of view (FOV) of the image-capturing device and capturing an image of the pattern-generating device; (D) generating at least one set of pattern data by using the captured image of the pattern-generating device; and (E) processing each set of generated pattern data by using in order to generate an altitude and/or angular coordinates of the object.

16 Claims, 14 Drawing Sheets

(56) References Cited

U.S. PATENT DOCUMENTS

| | | | |
|---|---|---|---|
| 8,035,078 B1* | 10/2011 | Payton et al. | 250/221 |
| 8,224,024 B2* | 7/2012 | Foxlin et al. | 382/103 |
| 8,547,428 B1* | 10/2013 | Olsson et al. | 348/84 |
| 2002/0033884 A1* | 3/2002 | Schurr | 348/127 |
| 2004/0168148 A1 | 8/2004 | Goncalves et al. | |
| 2005/0125142 A1 | 6/2005 | Yamane | |
| 2005/0209815 A1 | 9/2005 | Russon et al. | |
| 2008/0180693 A1* | 7/2008 | Dillon | G01B 11/2527 356/521 |
| 2009/0225321 A1* | 9/2009 | Bendall et al. | 356/447 |
| 2009/0238449 A1* | 9/2009 | Zhang et al. | 382/165 |
| 2009/0262974 A1 | 10/2009 | Lithopoulos | |
| 2010/0091112 A1* | 4/2010 | Veeser et al. | 348/207.1 |
| 2010/0141759 A1 | 6/2010 | Scherzinger | |
| 2010/0172546 A1 | 7/2010 | Sharp | |
| 2010/0174507 A1 | 7/2010 | Vogel | |
| 2012/0158179 A1* | 6/2012 | Ooga | 700/259 |
| 2012/0253201 A1* | 10/2012 | Reinhold | 600/473 |

FOREIGN PATENT DOCUMENTS

| | | |
|---|---|---|
| EP | 1944572 A1 | 7/2008 |
| EP | 2240740 A1 | 10/2010 |
| WO | WO2009100773 | 8/2009 |
| WO | WO2009100774 | 8/2009 |
| WO | WO2009103342 | 8/2009 |
| WO | WO2009106141 | 9/2009 |
| WO | WO2010080950 | 7/2010 |

OTHER PUBLICATIONS

Kohler et al. "TrackSense: Infrastructure Free Precise Indoor Positioning Using Projected Patterns", A LaMarca et al. (Eds.): Pervasive 2007, LNCS 4480, pp. 334-350, Springer-Verlag Berlin Heidelberg, 2007.

Lemaire et al. "Vision-Based SLAM: Stereo and Monocular Approaches", International Journal of Computer Vision 74 (3), 343-364, Springer Science + Business Media, LLC, USA, 2007.

M.D. Chapman, M.G. Farley; "Monocular SLAM"; GPS World; Sep. 1, 2008.

* cited by examiner

IMAGE BASED ANGLE SENSOR

TECHNICAL FIELD

The technology relates to the field of image-based measurement.

BACKGROUND

To apply computerized methods to physical measurements, such as relative angle and distance, sensors must be employed. The declining cost and improving quality of image sensors make them attractive for uses beyond photographic imaging. This application describes methods for measuring relative angles and distances between objects using image sensors.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method of image-based positioning is provided. The method comprises: (A) providing an image-capturing device integrated with an object; (B) providing a pattern-generating device configured to generate a set of patterns; (C) locating the pattern-generating device in a field of view (FOV) of the image-capturing device and capturing an image of the pattern-generating device; (D) generating at least one set of pattern data by using the captured image of the pattern-generating device; and (E) processing at least one set of generated pattern data in order to generate a distance and/or angular coordinates of the object.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

I. Angular Measurements.

Figure 1:
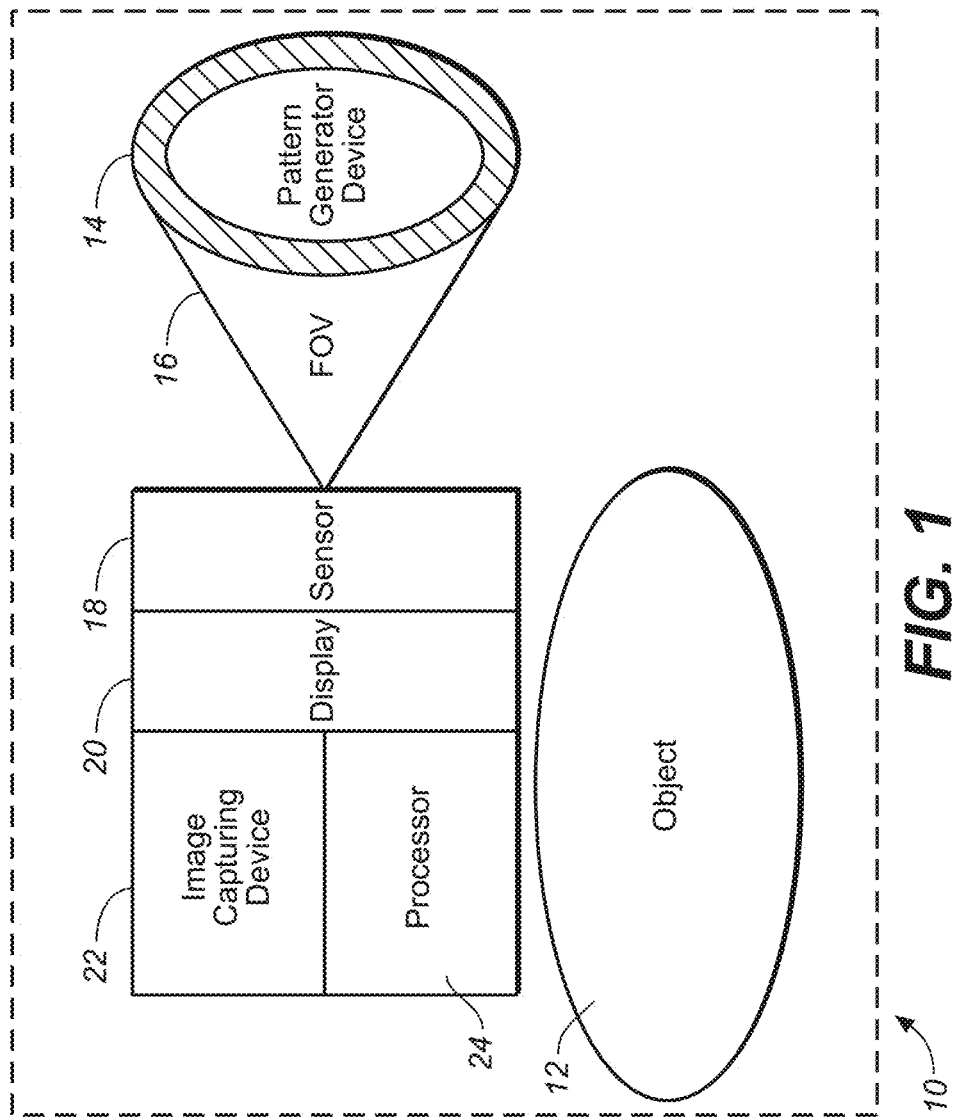
FIG. 1 depicts a positioning apparatus configured to obtain angular coordinates of an object, wherein a pattern generating device is located outside the object, in accordance with an embodiment of the present technology.

FIG. 1 depicts a positioning apparatus 10 configured to obtain angular coordinates of an object 12, wherein a pattern generating device 14 is located outside the object 12, in accordance with an embodiment of the present technology. The image capturing device 22 is a light-tight box in which an image of the pattern generating device 14 is formed by a pinhole or lenses (not shown) at an image sensor plate 18.

Except in a pinhole camera, which focuses the image on the film through a tiny hole, all other cameras use lenses for focusing. The focal length of lenses, determines the angle of view, or field of view (FOV) 16 and the size of objects as they appear on the imaging surface-sensor plate 32. The image is focused on that surface by adjusting the distance between the lenses and the surface.

In an embodiment of the present technology, the lens further comprises regular rectilinear lens. Rectilinear lens is a lens in which straight lines are not substantially curved or distorted. In this embodiment of the present technology, Field of View (FOV) 16 further comprises a narrow angle FOV.

In an embodiment of the present technology, the lens further comprises a fisheye lens. A fisheye lens is a wide-angle lens that takes in an extremely wide, sometimes hemispherical image. Fisheye lenses are often used for surveillance or to capture photographs of broad landscapes or tight interior spaces. Fisheye lenses achieve extremely wide angles of view by forgoing a rectilinear image, opting instead for a special mapping (for example: equisolid angle), which gives images a characteristic convex appearance. In this embodiment of the present technology, Field of View (FOV) 16 further comprises a wide angle FOV.

In an embodiment of the present technology, the lens further comprises custom-calibrated lenses.

In an embodiment of the present technology, the image capturing device 22 further comprises a display 20 further comprising an optical display, a liquid crystal display (LCD), or a screen.

The fundamental element of an image of an object is the pixel which describes color or a grayscale within a solid angular portion of the field of view.

Each pixel contains a series of numbers which describe its color or intensity. The precision to which a pixel can specify color is called its bit or color depth. The more pixels an image contains, the more detail it has the ability to describe.

Since a pixel is just a logical unit of information, it is useless for describing real-world dimensions unless you also specify their size. The term pixels per inch (PPI) is introduced to relate this theoretical pixel unit to real-world visual resolution.

"Pixels per inch" (PPI) is a very straightforward term. It describes just that: how many pixels an image contains per inch of distance in the horizontal and vertical directions on the object being imaged.

When the camera's shutter button is pressed and the exposure begins, each of these pixels has a "photo site" which stores photons. Once the exposure finishes, the camera tries to assess how many photons fell into each. The relative quantity of photons in each cavity are then reported as various intensity levels, whose precision is determined by bit depth (0-255 for an 8-bit image).

Each cavity is unable to distinguish how much of each color has fallen in, so the above description would only be able to create grayscale images. One method used to extend digital image sensors to capture color information is to filter light entering each cavity allowing the sensor to distinguish between Red (R), Green (G) and Blue (B) lights.

In an embodiment of the present technology, the image-capturing device 22 is selected from the group consisting of: a multispectral camera; a hyper spectral camera; a visible camera; an infrared (IR) camera; an ultraviolet (UV) camera; and a monochromatic camera.

A digital camera is a camera that takes video or still photographs, or both, digitally by recording images via an electronic image sensor. Digital cameras can do things film cameras cannot: displaying images on a screen immediately after they are recorded, storing thousands of images on a single small memory device, recording video with sound, and deleting images to free storage space. Some can crop pictures and perform other elementary image editing. Fundamentally they operate in the same manner as film cameras, typically using a lens with a variable diaphragm to focus light onto an image pickup device.

The combination of the diaphragm and a shutter mechanism is used to admit the correct amount of light to the imager, just as with film; the only difference is that the image pickup device is electronic rather than chemical. Digital cameras are incorporated into many devices ranging from PDAs and mobile phones (called camera phones) to vehicles.

In an embodiment of the present technology, referring still to FIG. 1, the image capturing device 22 includes an infrared (IR) camera. A thermographic camera, sometimes called a FLIR (Forward Looking InfraRed), or an infrared camera less specifically, is a device that forms an image using infrared radiation, similar to a common camera that forms an image using visible light. Infrared energy is just one part of the electromagnetic spectrum that encompasses radiation from gamma rays, x-rays, ultra violet, a thin region of visible light, infrared, terahertz waves, microwaves, and radio waves. These are all related and differentiated in the length of their wave (wavelength).

All objects emit a certain amount of black body radiation as a function of their temperatures. Generally speaking, the higher an object's temperature is the more infrared radiation as black-body radiation it emits. A special camera can detect this radiation in a way similar to an ordinary camera does visible light. It works even in environments where the human eye cannot see because visible light levels do not matter. This makes it useful for rescue operations in smoke-filled buildings and underground.

Thermal imaging photography finds many other uses. For example, firefighters use it to see through smoke, find persons, and localize hotspots of fires. With thermal imaging, power line maintenance technicians locate overheating joints and parts, a telltale sign of their failure, to eliminate potential hazards. Thermal imaging cameras are also installed in some luxury cars to aid the driver.

In an embodiment of the present technology, referring still to FIG. 1, the image capturing device 22 includes an ultraviolet (UV) camera. Working in the ultraviolet (UV) portion of the spectrum offers significant advantages for some applications, For instance, for machine vision inspection reducing the effects of extraneous light can significantly improve contrast, speeding up or improving the accuracy of the system. With the use of CMOS cameras becoming widespread, a larger number of cameras now have significant UV sensitivity.

In an embodiment of the present technology, referring still to FIG. 1, the image capturing device 22 includes a monochromatic camera. In photography and computing, a grayscale or grayscale digital image is an image in which the value of each pixel is a single sample, that is, it carries only intensity information from a desired band of the electromagnetic spectrum.

In an embodiment of the present technology, the image capturing device 22 includes a multispectral camera. Multispectral imaging is a technology to acquire image data at specific wavelengths across the electromagnetic spectrum. The wavelengths may be separated by filters or by the use of instruments that are sensitive to particular wavelengths, including light from frequencies beyond the visible light range, such as infrared. Multi-spectral imaging can allow extraction of additional information that the human eye fails to capture with its receptors for red, green and blue.

Full-spectrum photography is a subset of multi-spectrum imaging. In practice, specialized broadband/full-spectrum film captures visible and near infrared light, commonly referred to as the "VNIR" Modified digital cameras can detect some ultraviolet, all of the visible and much of the near infrared spectrum, as most current digital imaging sensors are sensitive from about 350 nm to 1000 nm. An off-the-shelf digital camera contains an infrared hot mirror filter that blocks most of the infrared and a bit of the ultraviolet that would otherwise be detected by the image sensor, narrowing the accepted range from about 400 nm to 700 nm. Replacing a hot mirror or infrared blocking filter with an infrared pass or a wide spectrally transmitting filter allows the camera to detect the wider spectrum light at greater sensitivity. Without the hot-mirror, the red, green and blue (or cyan, yellow and magenta) colored micro-filters placed over the image sensor elements pass varying amounts of ultraviolet and infrared. A converted full-spectrum camera can be used for ultraviolet photography or infrared photography with the appropriate filters.

FluxData located in Rochester, N.Y. offers a series of 3CCD multi-spectral cameras of various resolution. Users can select from FluxData's a pre-configured 5 or 7 channel Red Green Blue (RGB) color model camera, or a Near Infrared (NIR) camera, or to configure a 3CCD camera with custom specified filters. A 3CCD multispectral camera provides the advantage of 3 unique imaging sensors with a single lens system.

In an embodiment of the present technology, referring still to FIG. 1, the image capturing device 22 includes a hyper spectral camera. Hyperspectral imaging collects and processes information from across the electromagnetic spectrum.

Hyperspectral sensors look at objects using a vast portion of the electromagnetic spectrum. Certain objects leave unique 'fingerprints' across the electromagnetic spectrum. These 'fingerprints' are known as spectral signatures and enable identification of the materials that make up a scanned object. For example, having the spectral signature for oil helps mineralogists find new oil fields. Hyperspectral sensors collect information as a set of 'images'. Each image represents a range of the electromagnetic spectrum and is also known as a spectral band. These 'images' are then combined and form a three dimensional hyperspectral cube for processing and analysis. The acquisition and processing of hyperspectral images is also referred to as imaging spectroscopy.

The distinction between hyperspectral and multispectral is usually defined as the number of spectral bands. Multispectral data contains from tens to hundreds of bands. Hyperspectral data contains hundreds to thousands of bands. However, hyperspectral imaging may be best defined by the manner in which the data is collected. Hyperspectral data is a set of contiguous bands (usually by one sensor). Multispectral is a set of optimally chosen spectral bands that are typically not contiguous and can be collected from multiple sensors. Resonon West located in Bozeman, Mont. manufactures different Digital Imaging Spectrometers. It should be obvious to a person skilled in the art that the current technology is not limited to any spectral band. The necessary requirement for the use of a given spectrum of electromagnetic radiation is a source of radiation in that band, and a sensor capable of measuring the reflected radiation in that band.

In an embodiment of the present technology, referring still to FIG. 1, the image capturing device 22 further comprises a sensor 18 selected from the group consisting of: a charge-coupled device (CCD); an active pixel sensor (APS) array; a Complementary Metal Oxide Silicon (CMOS) sensor; and a direct image sensor An image sensor is a device that converts an optical image to an electric signal. It is used mostly in digital cameras and other imaging devices.

An active pixel sensor (APS) is an image sensor consisting of an integrated circuit containing an array of pixel sensors, each pixel containing a photodetector and an active amplifier. There are many types of active pixel sensors including the CMOS APS used most commonly in cell phone cameras, web cameras and in some DSLRs. Such an image sensor is produced by a CMOS process (and is hence also known as a CMOS sensor), and has emerged as an alternative to charge-coupled device (CCD) imager sensors. Today, most digital still cameras use either a CCD image sensor or a CMOS sensor. Both types of sensor accomplish the same task of capturing light and converting it into electrical signals.

A CCD is an analog device. When light strikes the chip it is held as a small electrical charge in each photo sensor. The charges are converted to voltage one pixel at a time as they are read from the chip. Additional circuitry in the camera converts the voltage into digital information.

A direct image sensor, such as those manufactured by Foveon Inc. of Santa Clara, Calif., separates light into its color components based on the depth of penetration of the photons into the silicon. This obviates the need for individual color filters such as the Bayer pattern filters, and permits co-localization of color information.

In an embodiment of the present technology, referring still to FIG. 1, the apparatus 10 further comprises a pattern-generating device 14 selected from the group consisting of: a gradient-generating device; and a Siemens_star_pattern-generating device; and a Sunburst_pattern-generating device.

A Siemens star (not shown) is a device consisting of a pattern of bright "spokes" on a dark background, which radiate from a common centre and become wider as they get further from it. Theoretically the spokes only meet at the exact centre of the star; the spokes and the gaps between them become narrower the closer to the centre one looks, but they never touch except at the centre.

A Sunburst is a design or figure commonly used in architectural ornaments and design patterns. It consists of parts radiating out from a central disk in the manner of sunbeams. Sometimes part of a sunburst, a semicircular or semi-elliptical shape, is used.

In an embodiment of the present technology, referring still to FIG. 1, the gradient-generating device 14 is selected from the group consisting of: a colored sphere ball placed in a transparent enclosing sphere; a colored sphere ball including a magnet placed in a transparent enclosing sphere; a colored sphere ball including a non-magnetic weight placed in a transparent enclosing sphere; a colored non-sphere ball placed in a transparent enclosing sphere; a colored non-sphere ball including a magnet placed in a transparent enclosing sphere; a colored non-sphere ball including a non-magnetic weight placed in a transparent enclosing sphere; a colored circular disk; a colored circular disk including a magnet; a colored circular disk including a non-magnetic weight; a colored non-circular disk; a colored non-circular disk including a magnet; and a colored non-circular disk including a non-magnetic weight.

Figure 2:
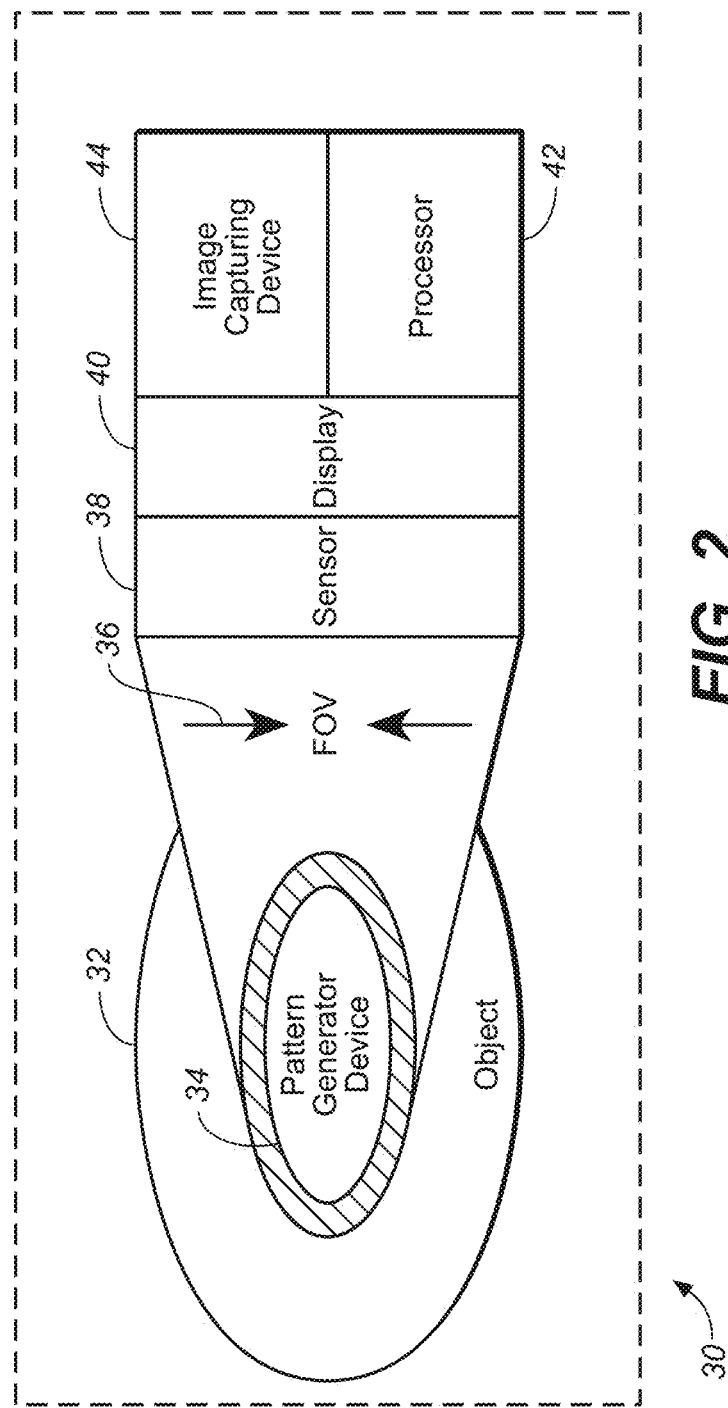
FIG. 2 illustrates a positioning apparatus configured to obtain angular coordinates of an object, wherein a pattern generating device is located inside the object, in accordance with an embodiment of the present technology.

In an embodiment of the present technology, FIG. 2 depicts a positioning apparatus 30 configured to obtain angular coordinates of an object 32, wherein a pattern generating device 34 is located inside the object 32.

Figure 3:
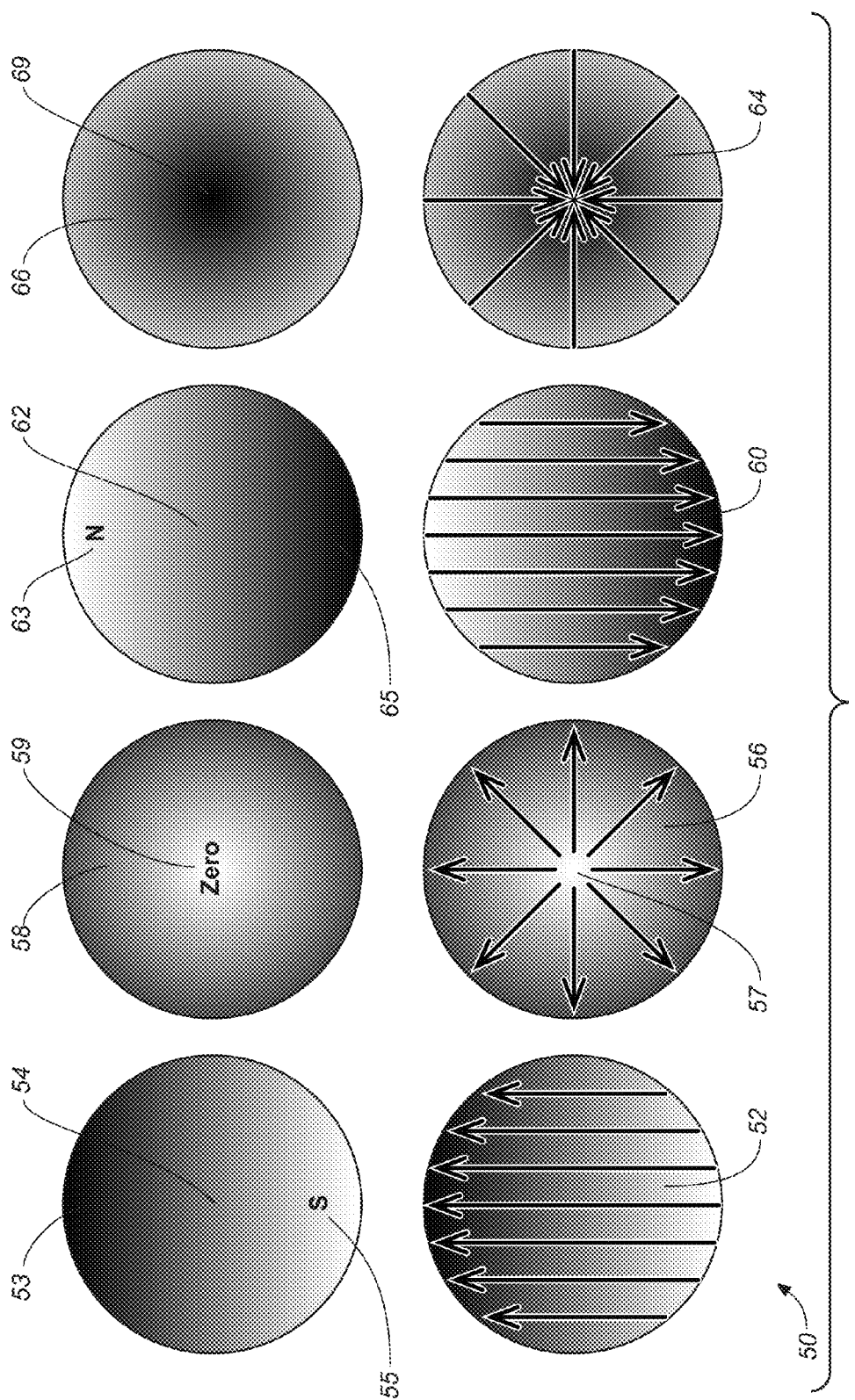
FIG. 3 illustrates the pattern-generating device further comprising a colored sphere that includes a one-dimensional intensity color gradient, or two-dimensional intensity color gradient in accordance with an embodiment of the present technology, wherein the text on the diagram is such that up corresponds with changing row rather than changing column.

In an embodiment of the present technology, FIG. 3 illustrates the pattern-generating device 50 (14 of FIG. 1, or 34 of FIG. 2) further comprising a sphere 54 that has a one-dimensional gradient pointing in one direction (South 55) according to the algorithm depicted as a one-dimensional set of arrows in an object 52. Each arrow goes from more intense to less intense. The text on the diagram is such that up corresponds with changing a column rather than changing a row.

In an embodiment of the present technology, FIG. 3 further illustrates the pattern-generating device 50 (14 of FIG. 1 or 34 of FIG. 2) further comprising a sphere 62 that has a one-dimensional gradient pointing in one direction (North 63) according to the algorithm depicted as a one dimensional set of arrows in an object 60.

In an embodiment of the present technology, FIG. 3 further illustrates the pattern-generating device 50 further comprising a sphere 58 that has a two-dimensional gradient pointing inward to the center point 59 according to the algorithm depicted as a two-dimensional set of arrows in object 56.

In an embodiment of the present technology, FIG. 3 further illustrates the pattern-generating device 50 further comprising a sphere 66 that has a two-dimensional gradient pointing outward from the center point 69 according to the algorithm depicted as a two-dimensional set of arrows in object 64.

Thus, FIG. 3 depicts two columns of images: the first column of images (54, 58, 62, and 66) representing the gradients themselves; and the second column of images (52, 56, 60, and 64) having arrows overlaid to emphasize the gradients directions. This can be understood to be 4 images of the same sphere from different perspectives. One-dimensional gradients can be implemented by using only brightness. For two-dimensional gradients, one should use multidimensional means because color can contain more than two dimensions of information.

In an embodiment of the present technology, referring still to FIG. 3, whereas the gradient-generating device (14 of FIG. 1, or 34 of FIG. 2) comprises a colored sphere ball placed in a transparent enclosing sphere, the color changes in linear pattern. More specifically, if an observer imagines a Cartesian coordinate system running through the center of the sphere ball (for instance, the center 57 of the ball 56) all points on the sphere with the same vertical coordinate y have the same color intensity regardless of the horizontal x, or orthogonal height z coordinate. It should be obvious to one skilled in the art to imagine that other gradient color schemes world work similarly.

Thus, in another embodiment of the present technology, all points on the sphere with the same horizontal coordinate x have the same color intensity regardless of the vertical y, or orthogonal height z coordinate.

In one more embodiment of the present technology, all points on the sphere with the same orthogonal height z coordinate have the same color intensity regardless of the horizontal coordinate x or the vertical coordinate y.

In an embodiment of the present technology, referring still to FIG. 3, the gradient-generating device (14 of FIG. 1, or 34 of FIG. 2) comprises a colored sphere ball 62 placed in a transparent enclosing sphere, and the North 63 point comprises the most painted pure blue point, and the blue fading out to black at the south most point 65.

In an embodiment of the present technology, referring still to FIG. 3, the top row (referring to the right) (images 66 and 64) is what the blue channel of the image sensor (18 of FIG. 1, or 38 of FIG. 2) would capture if an observer looks at the sphere from the South point, level with the sphere (meaning the observer looks at the darkest portion of the sphere). If an observer were off level, the gradients would converge at a point other than the center of the image. From this angle there is no way to tell if the sphere and camera share the same sense of up. Rotational symmetry makes that reference ambiguous.

In an embodiment of the present technology, referring still to FIG. 3, the second row (referring to the top row) (images 62 and 60) is what the sphere would look like from the West (the camera therefore is looking East). Rotational symmetry from this perspective means there is no way to tell from this image whether an observer is at level with the sphere, or above it, or below it. The most intense blue is to the left (Northward) and the least intense to the right (Southward) for the camera at any point to the West of the sphere assuming the camera and sphere share the same sense of "up".

In an embodiment of the present technology, referring still to FIG. 3, the third raw (images 58, and 56) is what the sphere would look like from the North, (the camera, therefore is looking South), with the most intense blue centered in the image. Rotational symmetry from this perspective means that there is no way to tell if the sphere and camera share the same sense of up.

In an embodiment of the present technology, referring still to FIG. 3, the fourth raw (images 54 and 52) is what the sphere would look like from the East (the camera therefore is looking West). Rotational symmetry from this perspective means there is no way to tell from this image whether an observer is at level with the sphere, or above it, or below it. The most intense blue is to the right (Northward) and the least intense to the left (Southward) for the camera at any point to the East of the sphere assuming the camera and sphere share the same sense of "up".

In an embodiment of the present technology, the color channels are independent. So there could be a red gradient present from the top to bottom, on the same sphere that the observer is looking at and it would not be (or would be less strongly) visible in the blue channel. The red gradient resolves the ambiguities that are present in the blue channel due to the rotational symmetry of a single gradient and gives an absolute measurement in all three angles.

In an embodiment of the present technology, if a color sensor is used, it is typically organized in a Bayer pattern. Essentially a color sensor is a monochrome sensor with color filters over each pixel. Using multiple gradient colors allow the usage of these additional pixels to improve the resolution of the sensor in resolving the gradient. For example, a red gradient will only make use of 25% of the available sensors. Red and Blue gradients in the same space will make use of 50% of the available sensors.

In an embodiment of the present technology, the relative position of each color pixel is not critical to any resolution calculation, because only the average of the gradient vector is calculated across the collection of pixels.

In an embodiment of the present technology, a colored gradient sphere can be used as a tilt meter/compass to effectively determine attitude.

In an embodiment of the present technology, the pattern-generating device (14 of FIG. 1 or 34 of FIG. 2) comprises a weighted magnetized ball. An observer can use a camera to look at the sphere and figure out where it is pointing. By determining the azimuth and elevation of the sphere, one can determine the compass direction, and the tilt from local vertical.

In an embodiment of the present technology, the simplest use is an angle measurement of relative rotation about an axis-one dimensional angular measurement.

In an embodiment of the present technology, an observer can use multiple color channels to enhance accuracy (because cameras are built to be color sensitive instruments). More specifically, by using a two-colored sphere as the pattern-generating device 50 of FIG. 3 (14 of FIG. 1 or 34 of FIG. 2), one can obtain attitude relative to the sphere; that is one can obtain azimuth, elevation and rotation, or roll, pitch and yaw between the camera and the sphere.

Resolution is, in part, dependent on the number of pixels. Resolution can be improved by using a sensor with more pixels. Also, one may use multiple color channels simultaneously in a color sensor. For instance, out of each 4 pixels in a standard Bayer pattern sensor one can use two green, one red and one blue for the maximum resolution.

In an embodiment of the present technology, one can make incremental angular measurements pixel by pixel, for every direction on a 2D sensor plate by using a gradient operator such as the Sobel operator. Technically, it is a discrete differentiation operator, computing an approximation of the gradient of the image intensity function. At each point in the image, the result of the Sobel operator is either the corresponding gradient vector or the norm of this vector. The Sobel operator is based on convolving the image with a small, separable, and integer valued filter in horizontal and vertical direction and is therefore relatively inexpensive in terms of computations. On the other hand, the gradient approximation which it produces is relatively crude, in particular for high frequency variations in the image. Similar functionality can be provided by the Roberts or Scharr operators, among others known to those skilled in the art.

Figure 4:
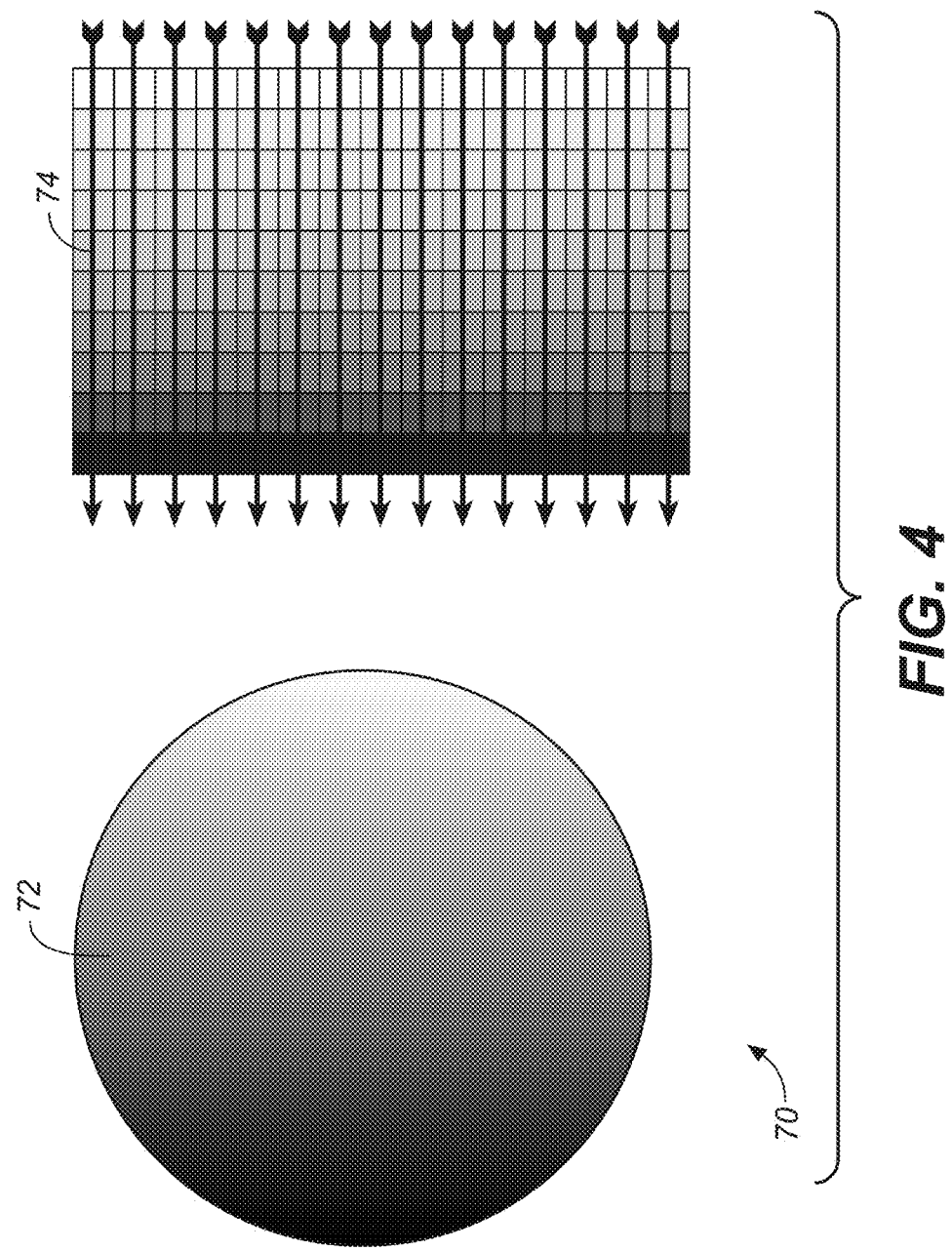
FIG. 4 shows how by differencing each pixel's luminosity with that of its surrounding pixels, each pixel can be assigned a steepest gradient, in accordance with an embodiment of the present technology.

In an embodiment of the present technology, wherein the gradient-generating device 14 of FIG. 1 (or 34 of FIG. 2) is selected as a colored circular disk, FIG. 4 illustrates how by differencing each pixel's luminosity with that of its surrounding pixels 74, each pixel can be assigned a steepest gradient 72. The gradients won't all align perfectly because of noise in the image and in the sensor, but by combining (summing, averaging, least squaring, etc) the individual vectors, the overall gradient of the image should be reliably determined and this gradient should give an unambiguous reading of rotational angle between the disc (14 of FIG. 1, 34 of FIG. 2) and the sensor. One expected advantage of this approach is that a large portion of the sensor area is used to good effect. This can provide advantages in resolution, noise immunity, and as described below in combining multiple measurements onto a single sensor In an embodiment of the present technology, if a grayscale disc is used as a pattern generating device (14 of FIG. 1, 34 of FIG. 2); the gradient varies from white to black. This would be the appropriate coloring to use for a monochromatic image sensor, of if utilizing all colors of a color sensor.

Figure 6:
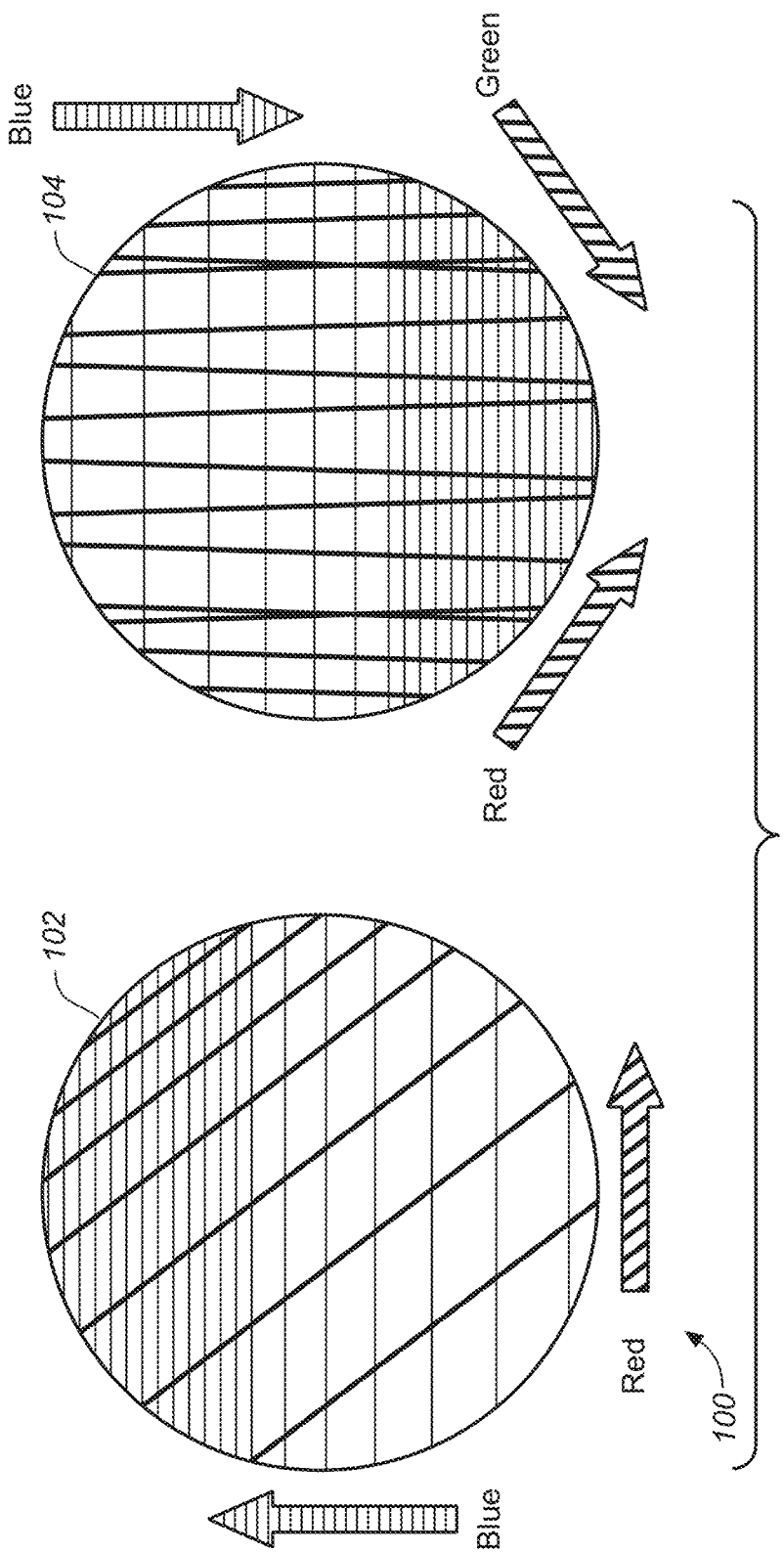
FIG. 6 illustrates a class of gradients where the color gradients cross at different angles, such as a vertical blue gradient and a horizontal red gradient.

In an embodiment of the present technology, FIG. 6 illustrates 80 how the appropriate coloring can be used as a pattern generating device (14 of FIG. 1, 34 of FIG. 2), in accordance with an embodiment of the present technology.

When using a color sensor, however, there are alternatives that might give better results, or make better use of the 3 independent color channels. Some examples would be to select one color, such as blue, (blue-black disc 82 of FIG. 4) and blend that color to black (the arrow 88). Given the proper color blue, this should give no return to the red and green channels while giving the same luminosity gradient to the blue channel as the grayscale disc would.

On the other hand, blending blue to white (blue-white disc 84 of FIG. 4) would light up the blue channel evenly across while giving gradients to the red (the arrow 90) and green (the arrow 92) channels.

In an embodiment of the present technology, blending blue to yellow (the blue-yellow disc 86 of FIG. 4) would give a blue gradient in one direction (the arrow 98) while giving red (the arrow 94) and green (the arrow 96) gradients in the opposite direction.

In an embodiment of the present technology, magenta to green might be a preferable color gradient in this case because green typically has twice as many pixels in the sensor as either red or blue, so this combination would give an equal number of pixels to both counter-gradients.

Figure 5:
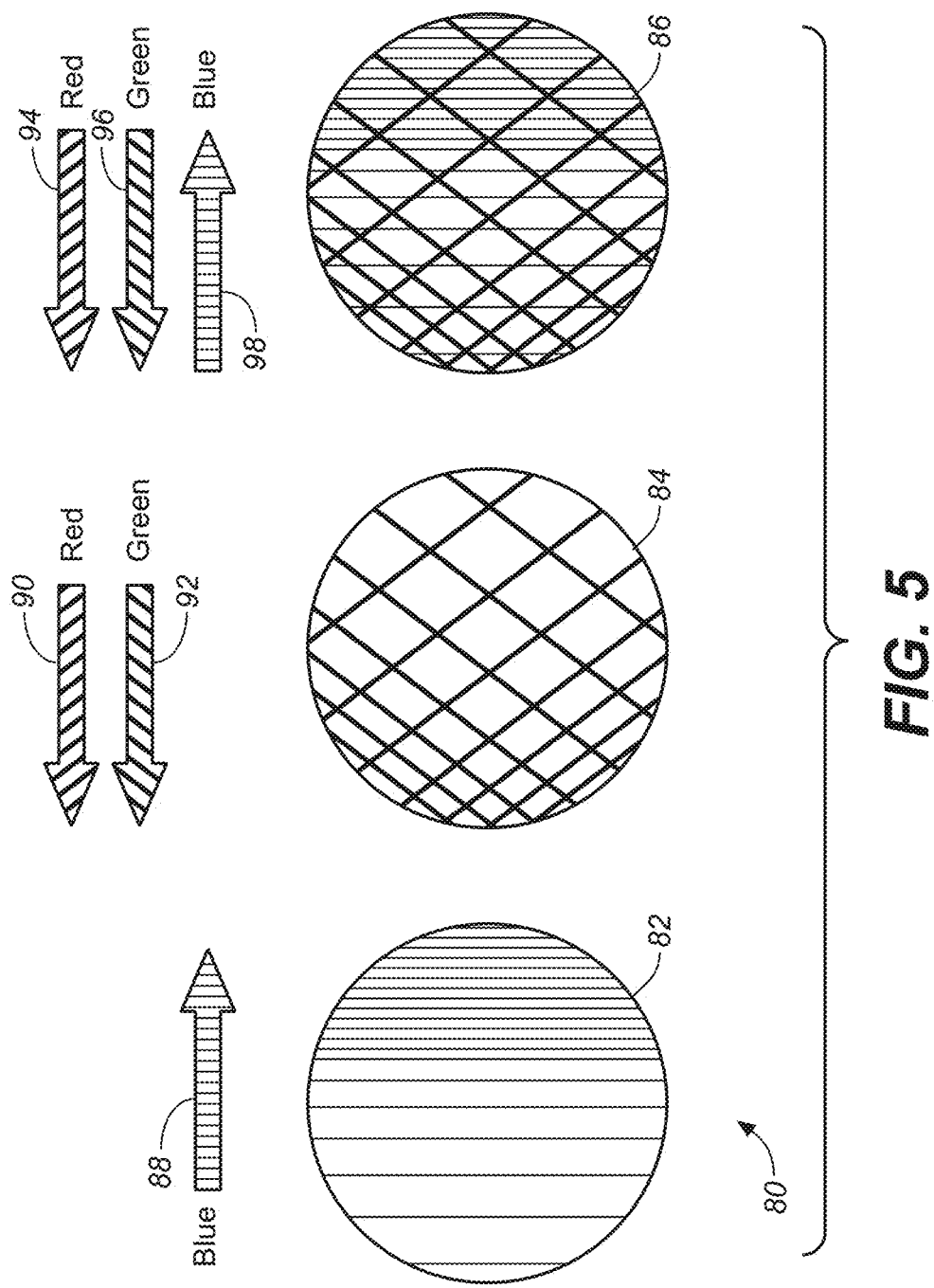
FIG. 5 illustrates how the appropriate coloring can be used as a pattern generating device, in accordance with an embodiment of the present technology.

In an embodiment of the present technology, FIG. 6 illustrates a class of gradients 100 where the color gradients cross at different angles, such as a vertical blue gradient and a horizontal red gradient as shown in color disc 102. All 3 colors could cross at 120 degrees, as shown in color disc 104 of FIG. 5. There may be reasons, based on sensor design or other practical matters, that one pattern works better than another—ensuring that all gradients aren't parallel with the sensor grid, for example.

Lighting of the target disc should be very even to prevent lighting artifacts from appearing to be color gradients. The target reflected color should be chosen to match the color spectrum of the light source. This will be of particular concern with narrow band or line spectra sources such as LEDs and certain types of fluorescents.

There are some practical issues with how color is applied. Among them is the ability of the sensor to distinguish color. If the sensor permits the color to be encoded in 8 bits, there are only 256 different levels of color that will be recognized, and the sensor will view a smooth gradient as banded. This effect doesn't undermine the present technology as the necessary gradients will be found at the band edges, but it will introduce a good amount of noise within the band. Additional processing and smoothing in the image processor can overcome this effect.

In an embodiment of the present technology, alternative coding schemes can be employed, such as striping the disc with increasing stripe density, as an example. Two colors could be applied with a similar effect by using a checker board approach with non-square, non uniform cells on the board.

Figure 7:
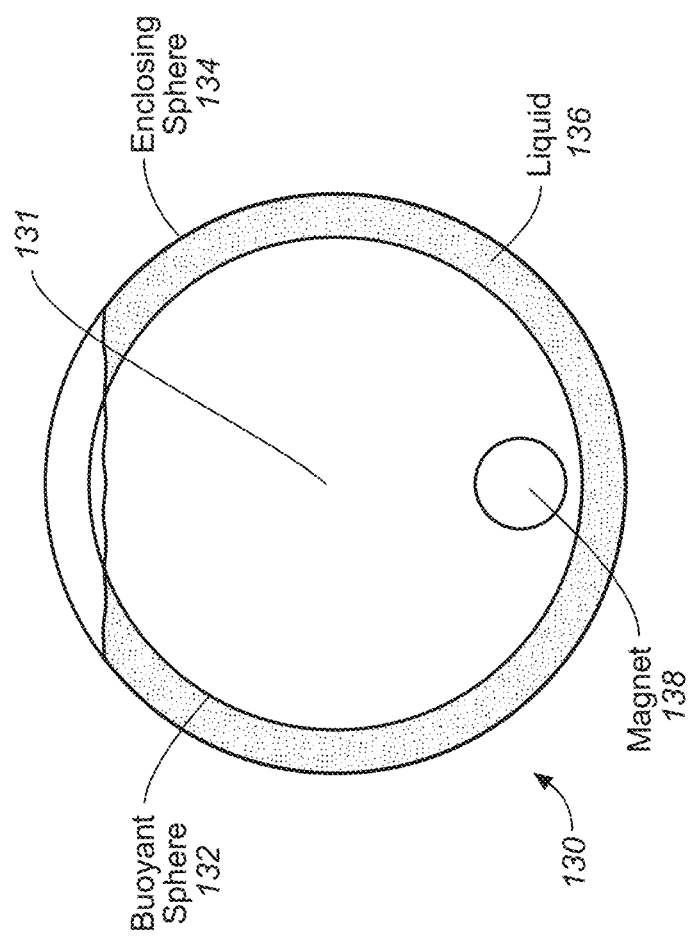
FIG. 7 depicts a colored ball floating in a transparent enclosing sphere as a pattern generating device, in accordance with an embodiment of the present technology.

In an embodiment of the present technology, FIG. 7 depicts 130 a colored ball 131 floating in liquid 136 placed in a transparent enclosing sphere 134 as a pattern generating device.

Tilt and roll are measured against gravity by weighting the ball so that the weighted end points to the center of the earth. Yaw is achieved by inserting a magnet 138 into the ball (which can also serve as the weight), allowing measurement against magnetic north. If the use of a magnet proves impractical, then a non-magnetic weight can be used to establish tilt and roll, while discounting the yaw measurement. The sphere is colored with two gradients crossing at 90°. The gradients in this example are such that on a Cartesian coordinate system centered in the sphere with the negative z-axis pointing North and the negative x-axis pointing West, all points on the sphere with the same z coordinate contain the same amount of blue pigment (more negative being more blue) and all points with the same x coordinate have the same red pigment (more negative being more red).

In an embodiment of the present technology, a camera (not shown) is fixed relative to the enclosing sphere, viewing the ball. By capturing the gradients in the two color spaces, all three degrees of freedom can be measured as illustrated below.

Viewing the ball from the North, and level, the strongest blue signal is centered with gradients pointing inward radially from all directions equally. The strongest red signal is positioned to the right with gradients pointed parallel and horizontal from left to right. Rotating to view from the East, the blue center begins moving off center to the right and the gradients gradually become parallel until they all align parallel and horizontal pointing left to right, while the weakest red point moves center and the gradients become radial and outward, opposite to what they were for blue when looking North. Rolling 180° from this position causes no change in red while the blue gradients remain parallel and rotate from pointing right to pointing left. Pitching 90° from this position to view directly towards the center of the Earth will result in two linear gradient fields crossing the image. Please, see FIG. 8.

Figure 8:
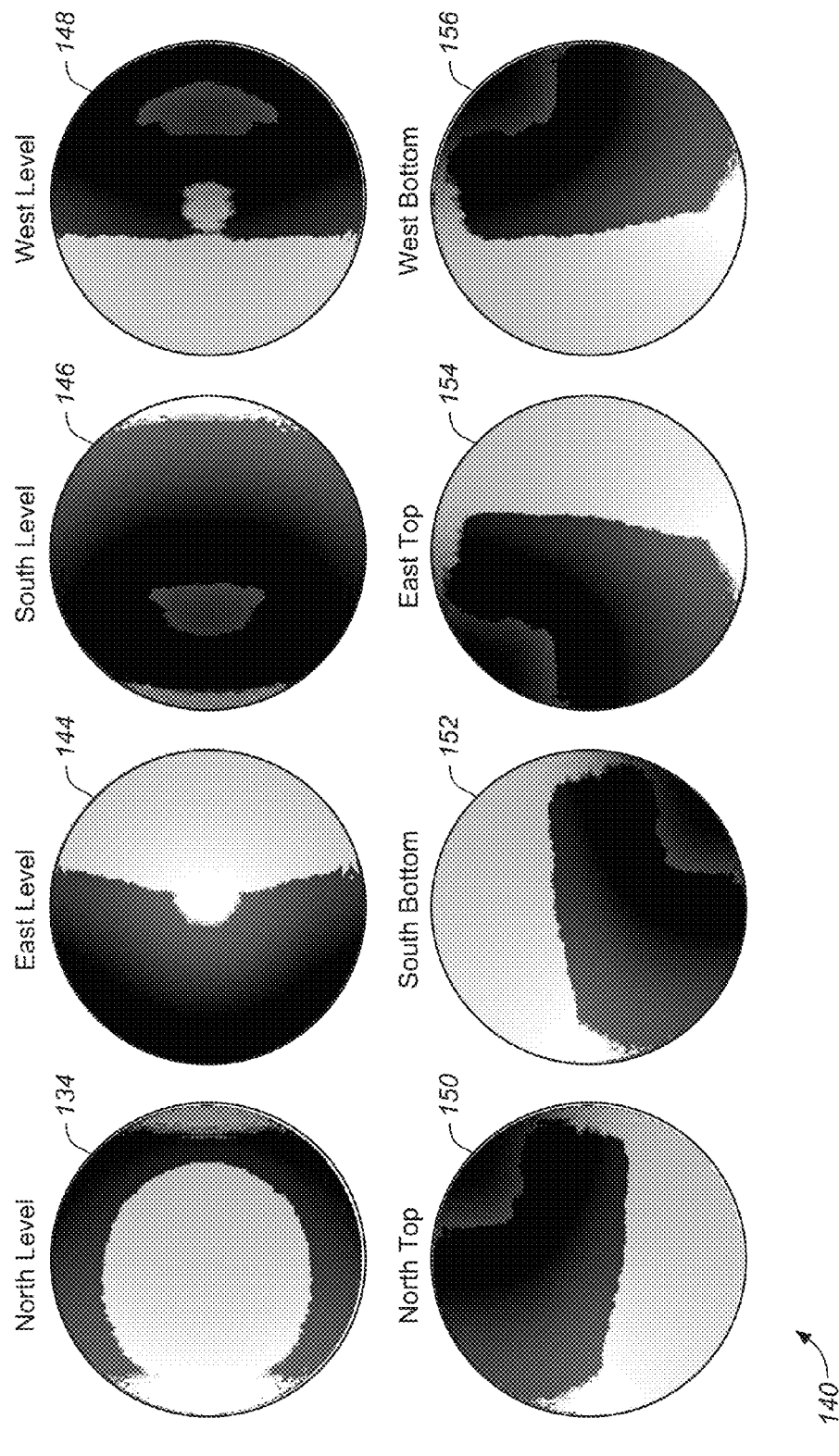
FIG. 8 illustrates how 8 images (North level; East Level; South level; West level; North top; North bottom; East Top; and West Bottom) give examples to indicate that any orientation can be determined uniquely, in accordance with an embodiment of the present technology.

In an embodiment of the present technology, FIG. 8, illustration 140 shows how 8 example images (North level—142; East Level—144; South level—146; West level 148; North top—150; North bottom—152; East Top—154, and West Bottom—156) indicate that any orientation can be determined uniquely.

In operation, in an embodiment of the present technology, the method of image-based measurement of an object by using an apparatus 10 of FIG. 1 (or 30 of FIG. 2) comprises locating the pattern-generating device 14 of FIG. 1 (or 34 of FIG. 2) in the field of view (FOV) 16 of FIG. 1 (or 36 of FIG. 2) of the image-capturing device 22 of FIG. 1 (or 44 of FIG. 2) and capturing at least one image of the pattern-generating device 14 of FIG. 1 (or 34 of FIG. 2).

At the next step, in an embodiment of the present technology, the method of image-based measurement of an object by using an apparatus 10 of FIG. 1 (or 30 of FIG. 2) further comprises generating at least one set of pattern data by using at least one captured image of the pattern-generating device 14 of FIG. 1 (or 34 of FIG. 2), and processing at least one set of generated pattern data by using the processor 24 of FIG. 1 (or 42 of FIG. 2) in order to determine angular coordinates of the object 12 of FIG. 1 (or 32 of FIG. 2).

II Distance Measurements.
A. Scale Measurements

Figure 9:
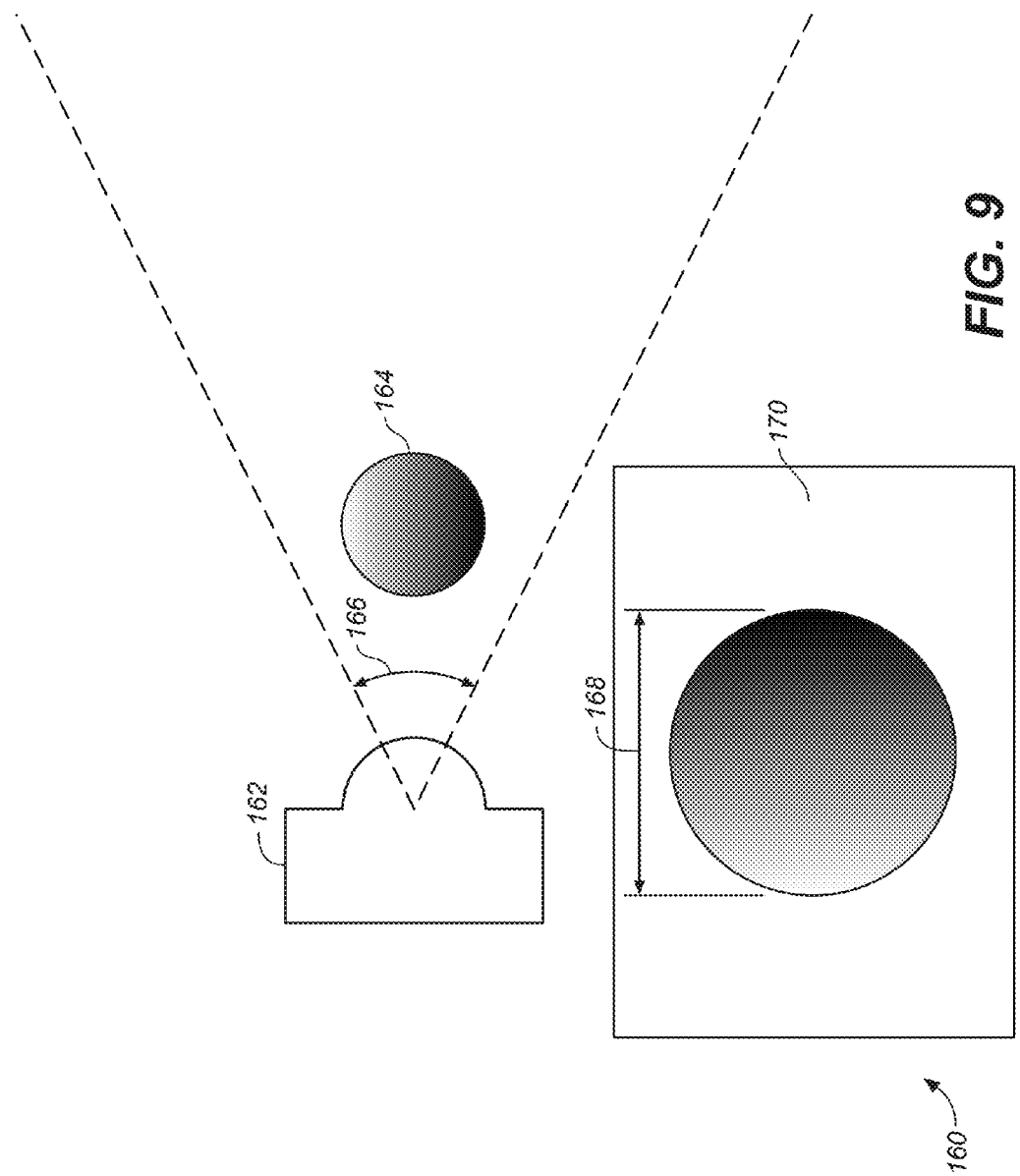
FIG. 9 shows a pattern-generating device located in a first field of view (FOV) of the image-capturing device and a captured first image of the pattern-generating device located in the first field of view (FOV), in accordance with an embodiment of the present technology.
Figure 10:
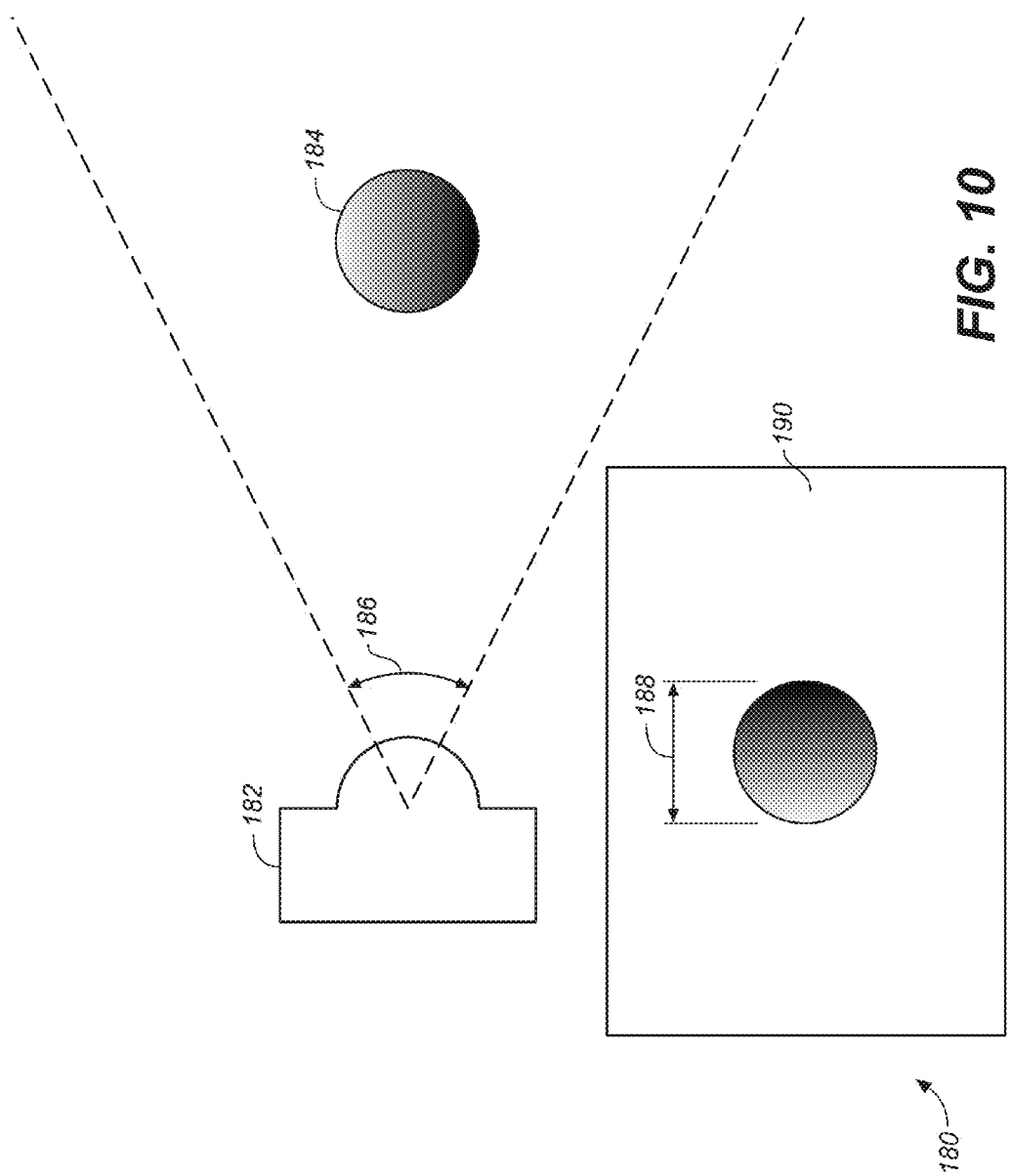
FIG. 10 depicts a pattern-generating device located in a second field of view (FOV) of the image-capturing device and captured second image of the pattern-generating device located in the second field of view (FOV), in accordance with an embodiment of the present technology.

In an embodiment of the present technology, FIGS. 9 and 10 illustrate measurement of scale. The image-capturing device 162 of FIG. 9 uses its lenses to set the first field of view (FOV) 166 indicated by the dashed lines, and a gradient sphere 164 is visible within this first FOV.

The rectangular portion 170 in the bottom left of the image represents the first image captured by the image-capturing device 162, and the dimension line 168 highlights that the sphere, in this case, would fill half of the horizontal space of the image.

In an embodiment of the present technology, the image-capturing device 182 of FIG. 10 (which is the same device 162 of FIG. 9) uses its lenses to set the second field of view (FOV) 186 indicated by the dashed lines, and the same gradient sphere 184 is visible within this second FOV.

The rectangular portion 190 in the bottom left of the second image represents the second image captured by the image-capturing device 182, and the dimension line 188 highlights that the same sphere, would fill less than half of the horizontal space of the second image 190.

Thus, the second image of the same format represents the same items arranged such that the same gradient sphere is located further from the image-capturing device. The sphere is the same size, but consumes a smaller fraction of the field of view. This is apparent in the representative image 190 in the lower left.

In an embodiment of the present technology, the distance from the sphere 164 of FIG. 9 to the image-capturing device can be determined if the angle of view (the angle between dashed lines) and the size of the sphere are known.

B. Spatial Frequencies Measurements.

In an embodiment of the present technology, FIGS. 11-14 illustrate the spatial frequencies method of distance measurement.

Figure 11:
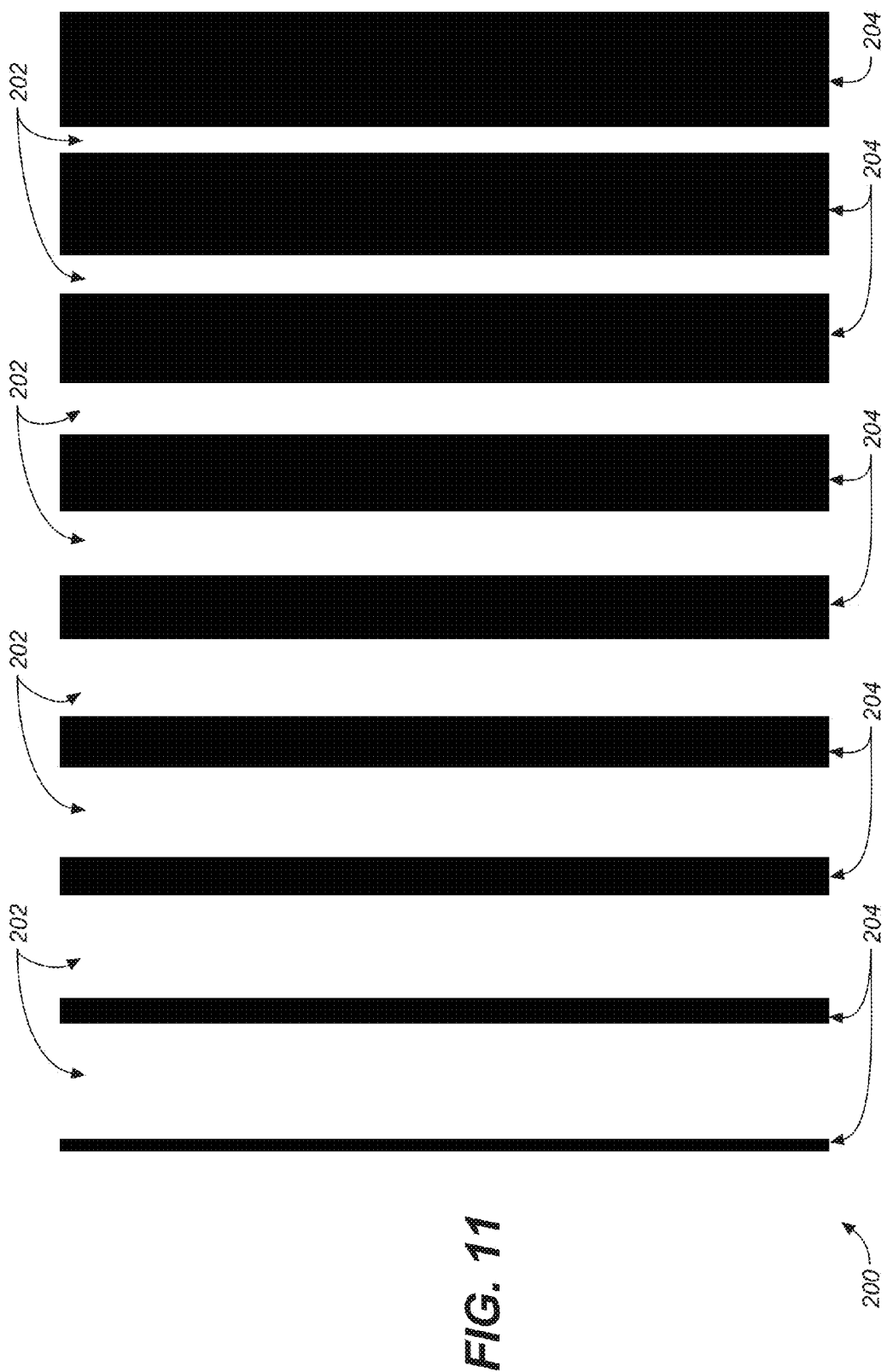
FIG. 11 depicts a discreet pattern-generating device located in a first field of view (FOV) of the image-capturing device, in accordance with an embodiment of the present technology.

In an embodiment of the present technology, FIG. 11 shows a discreet pattern 200 as one example of a pattern of known characteristics. The direction of the gradient can be determined by the change from mostly white spaces 202 to mostly black spaces 204.

Figure 13:
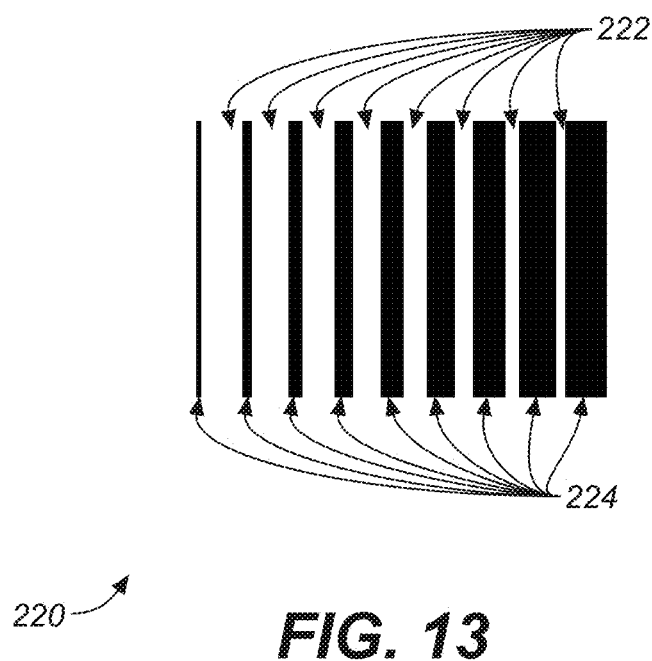
FIG. 13 depicts a discreet pattern-generating device located in a second field of view (FOV) of the image-capturing device, in accordance with an embodiment of the present technology.

In an embodiment of the present technology, FIG. 11 depicts the gradient pattern 200 that is located closer to the image-capturing device as compared to the gradient pattern 220 of FIG. 13.

Figure 14:
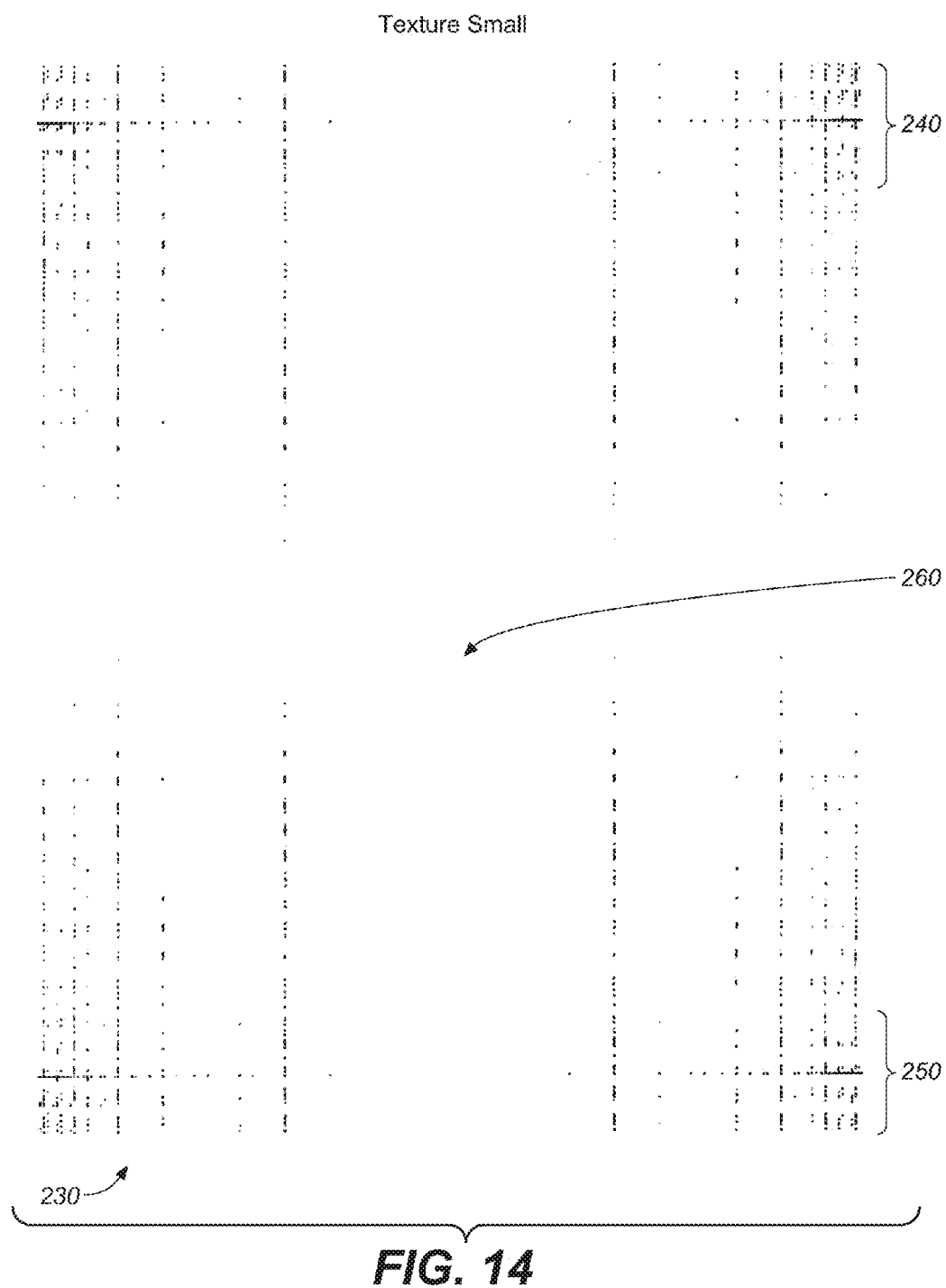
FIG. 14 shows a two-dimensional (2D) Fast Fourier Transform (FFT); image of the discreet pattern-generating device located in the second field of view (FOV) of the image-capturing device, in accordance with an embodiment of the present technology.

There is a spatial frequency associated with the light and dark pattern, which can be extracted though the use of a two-dimensional (2D) Fast Fourier Transform (FFT). The FFT image 210 of pattern 200 is shown in FIG. 12, whereas the FFT image 230 of pattern 220 is shown in FIG. 14.

There are many methods suitable for determining spatial frequencies in addition to the 2D FFT. Wavelet transforms are on such alternative. In addition, it may not be necessary to determine spatial frequencies in more than one direction. For the patterns 200 in FIG. 11 and 220 in FIG. 13, it would be sufficient to determine the one dimensional FFT along a consistent gradient path, such as the strongest gradient.

Figure 12:
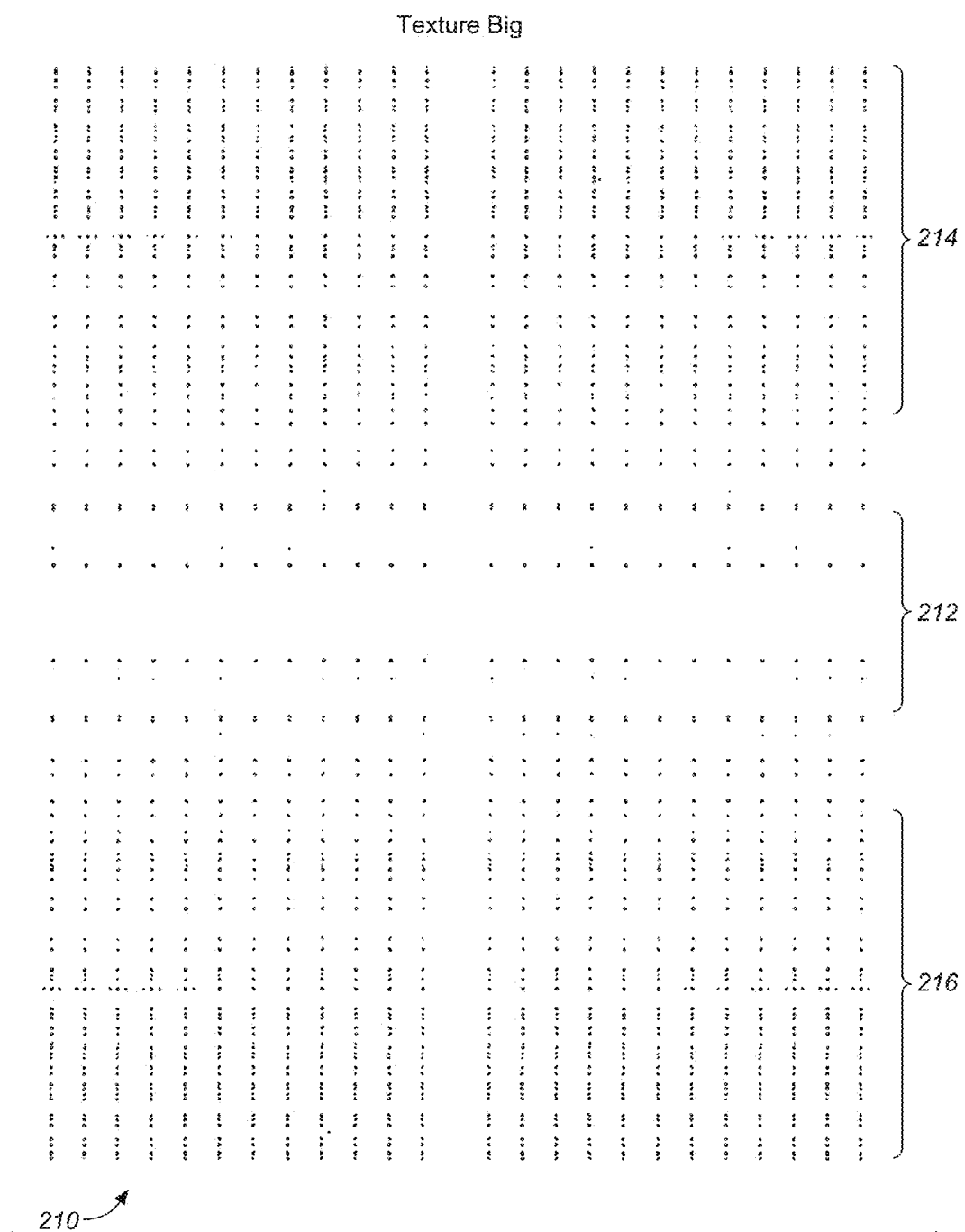
FIG. 12 shows a two-dimensional (2D) Fast Fourier Transform (FFT); image of the discreet pattern-generating device located in the first field of view (FOV) of the image-capturing device, in accordance with an embodiment of the present technology.

In the FFT image 210 of FIG. 12, points closer to the center 212 represent low frequency, and points further to the edges 214 and 216 represent higher frequencies.

When the pattern 220 is brought further from the image-capturing device, as shown in FIG. 13, the captured image changes. The apparent spatial frequency shifts up, as seen in the FFT image 230 of FIG. 14. Frequencies have shifted away from the center 260, and towards the edges and corners 240 and 250, indicating that higher spatial frequencies are present in the image. The distance from the pattern to the image-capturing device can be determined if the angle of view and the size of the pattern are known.

It is known to a person of ordinary skill in the art that measuring the distance or angle of one object relative to a second object is a reversible process and is equivalent to measuring the angle or distance of the second object relative to the first. Where such measurements are described in the preceding descriptions, it is intended that either calculation may be made.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices. The present technology may also be implemented in real time or in a post-processed or time-shifted implementation where sufficient data is recorded to permit calculation of final results at a later time.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. An apparatus for image-based positioning of an object comprising:
   (A) an image-capturing device;
   (B) a pattern-generating device comprising a structure having a first pole and a second pole opposite of the first pole, the structure includes a gradient pattern that extends from the first pole to the second pole, wherein said image-capturing device is configured to capture at least one image of said pattern-generating device while said pattern-generating device is located outside of said object and separate from said object;
   and
   (C) a processor configured to generate at least one set of pattern data by using said at least one image; and configured to analyze each said set of generated pattern data in order to determine angular coordinates of said object.

2. The apparatus of claim 1, wherein said image-capturing device is selected from the group consisting of:
   a multispectral camera; a hyper spectral camera; a visible camera; an infrared (IR) camera; an ultraviolet (UV) camera; and a monochromatic camera.

3. The apparatus of claim 1, wherein said pattern-generating device is selected from the group consisting of:
   a gradient-generating device; and a Siemens_star_pattern-generating device; and a Sunburst_pattern-generating device.

4. The apparatus of claim 3, wherein said pattern-generating device is selected from the group consisting of:
   a gradient-generating device selected from the group consisting of: a colored sphere ball placed in a transparent enclosing sphere; a colored sphere ball including a magnet placed in a transparent enclosing sphere; a colored sphere ball including a non-magnetic weight placed in a transparent enclosing sphere; a colored non-sphere ball placed in a transparent enclosing sphere; a colored non-sphere ball including a magnet placed in a transparent enclosing sphere; a colored non-sphere ball including a nonmagnetic weight placed in a transparent enclosing sphere; a colored circular disk; a colored circular disk including a magnet; a colored circular disk including a non-magnetic weight; a colored non-circular disk; a colored non-circular disk including a magnet; and a colored non-circular disk including a non-magnetic weight.

5. The apparatus of claim 4, further comprising:
   a sensor; wherein said sensor is selected from the group consisting of:
   a charge-coupled device (CCD); an active pixel sensor (APS) array; a Complementary Metal Oxide Silicon (ClMOS) sensor; and a direct image sensor.

6. A method of image-based positioning of an object using an apparatus comprising an image-capturing device, a pattern-generating device, and a processor; said method comprising:
   (A) capturing at least one image of said pattern-generating device by using said image-capturing device; wherein said at least one image is captured while said pattern-generating device is located outside of said object and separate from said object, the pattern-generating device comprising a structure having a first pole and a second pole opposite of the first pole, wherein the structure includes a gradient pattern that extends from the first pole to the second pole, and wherein the image containing at least a portion of the directional gradient pattern of said pattern-generating device;
   (B) generating at least one set of pattern data by using said at least one image by using said processor;
   and
   (C) using said processor to analyze each said set of generated pattern data in order to determine angular coordinates of said object.

7. The method of claim 6, wherein said step (A) of capturing said at least one image of said pattern-generating device by using said image-capturing device further comprises:
   (A1) selecting said image-capturing device from the group consisting of:
   a multispectral camera; a hyper spectral camera; a visible camera; an infrared (IR) camera; an ultraviolet (UV) camera; and a monochromatic camera.

8. The method of claim 6, wherein said step (A) of capturing said at least one image of said pattern-generating device by using said image-capturing device further comprises:
   (A2) selecting said pattern-generating device from the group consisting of:
   a gradient-generating device; and a Siemens_star_pattern generating device; and a Sunburst_pattern-generating device.

9. The method of claim 8, wherein said step (A2) further comprises:
   (A2, 1) selecting said pattern-generating device from the group consisting of:
   a colored sphere ball placed in a transparent enclosing sphere; a colored sphere ball including a magnet placed in a transparent enclosing sphere; a colored sphere ball including a non-magnetic weight placed in a transparent enclosing sphere; a colored non-sphere ball placed in a transparent enclosing sphere; a colored non-sphere ball including a magnet placed in a transparent enclosing sphere; a colored non-sphere ball including a non-magnetic weight placed in a transparent enclosing sphere; a colored circular disk; a colored circular disk including a magnet; a colored circular disk including a non-magnetic weight; a colored noncircular disk; a colored non-circular disk including a magnet; and a colored non-circular disk including a non-magnetic weight.

10. The method of claim 8, wherein said apparatus further comprises a sensor; and wherein said step (A2) further comprises:
- (A2, 2) selecting said sensor from the group consisting of: a charge-coupled device (CCD); an active pixel sensor (APS) array; a Complementary Metal Oxide Silicon (CMOS) sensor; and a direct image sensor.

11. A method of image-based positioning of an object by using an apparatus comprising an image-capturing device, a pattern-generating device, and a processor; said method comprising:
- (A) capturing at least one image of said object;
- (B) capturing an image of said pattern-generating device while said pattern-generating device is located in a field of view (FOV) of said image-capturing device and while said pattern-generating device is located outside of said object and separate from said object, the pattern-generating device comprising a structure having a first pole and a second pole opposite of the first pole, wherein the structure includes a gradient pattern that extends from the first pole to the second pole, and wherein the image containing at least a portion of the directional gradient pattern of said pattern-generating device;
- (C) extracting, from the image, at least one spatial frequency associated with the target characteristics of said pattern of said pattern-generating device; and
- (D) processing said at least one spatial frequency to determine a distance of said object from said image-capturing device.

12. The method of claim 11, wherein said step (C) further comprises:
- (C1) extracting, from the image, a first spatial frequency associated with the target characteristics of said pattern of said pattern-generating device located in said field of view (FOV).

13. The method of claim 11, wherein said step (C) further comprises:
- (C2) using a two-dimensional (2D) Fast Fourier Transform (FFT) to extract a spatial frequency associated with a targeted pattern.

14. The method of claim 11, wherein said step (C) further comprises:
- (C3) using Wavelet transforms to extract a spatial frequency associated with a targeted pattern.

15. An apparatus for distance measurements of an object comprising:
- an image-capturing device;
- a pattern-generating device comprising a structure having a first pole and a second pole opposite of the first pole, the structure includes a gradient pattern that extends from the first pole to the second pole, wherein said image-capturing device is configured to capture a set of images of said pattern-generating device while said pattern-generating device is located in a field of view (FOV) of said image-capturing device and while said pattern-generating device is located outside of said object and separate from said object; and
- a processor, wherein said processor is configured to process said set of captured images of said pattern-generating device located in said field of view (FOV) of said image-capturing device, and the processor is also configured to use a scale associated with the set of patterns to determine a distance of said object from said image-capturing device.

16. The apparatus of claim 15, wherein said processor is configured to extract a first spatial frequency associated with the set of patterns of said pattern-generating device located in said field of view (FOV); and configured to process said spatial frequency to determine a distance of said object from said image-capturing device.

* * * * *